US011567537B2

(12) United States Patent
DeCamp et al.

(10) Patent No.: US 11,567,537 B2
(45) Date of Patent: *Jan. 31, 2023

(54) SYSTEMS, METHODS AND DEVICES FOR NATIVE AND VIRTUALIZED VIDEO IN A HYBRID DOCKING STATION

(71) Applicant: TARGUS INTERNATIONAL LLC, Anaheim, CA (US)

(72) Inventors: Ronald DeCamp, Long Beach, CA (US); Dan Tsang, Carlsbad, CA (US)

(73) Assignee: Targus International LLC, Anaheim, CA (US)

(*) Notice: Subject to any disclaimer, the term of this patent is extended or adjusted under 35 U.S.C. 154(b) by 34 days.

This patent is subject to a terminal disclaimer.

(21) Appl. No.: 17/198,104

(22) Filed: Mar. 10, 2021

(65) Prior Publication Data

US 2021/0191462 A1 Jun. 24, 2021

Related U.S. Application Data

(63) Continuation of application No. 16/849,858, filed on Apr. 15, 2020, now Pat. No. 11,023,008, which is a
(Continued)

(51) Int. Cl.
*G06F 1/16* (2006.01)
*G06F 13/38* (2006.01)
(Continued)

(52) U.S. Cl.
CPC .......... *G06F 1/1632* (2013.01); *G06F 13/385* (2013.01); *G06F 13/4022* (2013.01);
(Continued)

(58) Field of Classification Search
None
See application file for complete search history.

(56) References Cited

U.S. PATENT DOCUMENTS 5,627,974 A 5/1997 Watts, Jr. et al.
5,692,400 A 12/1997 Bliven et al.
(Continued)

FOREIGN PATENT DOCUMENTS

AU 2014100171 A4 3/2014
CN 101893916 A 11/2010
(Continued)

OTHER PUBLICATIONS

U.S. Appl. No. 16/446,440, Non-Final Office Action, dated Sep. 16, 2021, 15 pages.
(Continued)

*Primary Examiner* — Henry Tsai
*Assistant Examiner* — Christopher A Bartels
(74) *Attorney, Agent, or Firm* — Stoel Rives LLP

(57) ABSTRACT

A hybrid docking station determines whether native video data exists and can be passed through to a video port or whether a virtual video processor should be activated to provide virtual video data to a video port. For example, a laptop is connected to a hybrid docking station using a USB™ 3.0 connection. The hybrid docking station recognizes that the USB™ 3.0 connection includes a native video data and passes the native video data to a DisplayPort™. By avoiding activating a virtualized video processor and using native video data, the laptop avoids installing software to communicate with the virtualized video processor and communicates with one or more displays using a native video channel. By avoiding installing software, it simplifies IT's and user's usage and experience with universal docking station.

19 Claims, 9 Drawing Sheets

Related U.S. Application Data continuation of application No. 15/261,204, filed on Sep. 9, 2016, now Pat. No. 10,705,566.

(51) Int. Cl.
  *G06F 13/40* (2006.01)
  *G06F 13/42* (2006.01)
  *H04N 21/422* (2011.01)

(52) U.S. Cl.
  CPC ...... *G06F 13/4081* (2013.01); *G06F 13/4282* (2013.01); *H04N 21/422* (2013.01)

(56) References Cited

U.S. PATENT DOCUMENTS

| | | | |
|---|---|---|---|
| 5,835,733 A | 11/1998 | Walsh et al. | |
| 5,864,708 A | 1/1999 | Croft et al. | |
| 5,886,424 A | 3/1999 | Kim | |
| 6,029,215 A | 2/2000 | Watts, Jr. et al. | |
| 6,170,026 B1 | 1/2001 | Kimura et al. | |
| 6,604,199 B1 | 8/2003 | Yang et al. | |
| 6,629,182 B1 | 9/2003 | Mizoguchi et al. | |
| 6,665,805 B1 | 12/2003 | Tsirkel et al. | |
| 6,804,740 B1 | 10/2004 | Watts et al. | |
| 6,888,338 B1 | 5/2005 | Popescu-Stanesti et al. | |
| 6,956,474 B2 | 10/2005 | Jakubowski | |
| 6,976,885 B2 | 12/2005 | Lord | |
| 7,035,100 B2 | 4/2006 | Charles | |
| 7,035,126 B1 | 4/2006 | Lanni | |
| 7,099,152 B2 | 8/2006 | Gasbarro | |
| 7,103,760 B1 | 9/2006 | Billington et al. | |
| 7,171,461 B2 | 1/2007 | Ewing et al. | |
| 7,201,611 B2 | 4/2007 | Faranda | |
| 7,225,227 B2 | 5/2007 | Omura et al. | |
| 7,281,698 B2 | 10/2007 | Patterson, Jr. | |
| 7,403,232 B1 | 7/2008 | Orlicki et al. | |
| 7,471,511 B2 | 12/2008 | Montag et al. | |
| 7,643,283 B2 | 1/2010 | Jubelirer et al. | |
| 7,681,134 B1 | 3/2010 | Grechishkin et al. | |
| 7,683,573 B2 | 3/2010 | Nikazm et al. | |
| 7,899,970 B2 | 3/2011 | Mori | |
| 7,926,430 B2 | 4/2011 | Bakker | |
| 7,976,337 B1 | 7/2011 | Cortopassi et al. | |
| 8,074,581 B2 | 12/2011 | Epstein et al. | |
| 8,312,199 B2 | 11/2012 | Johnson | |
| 8,323,040 B2 | 12/2012 | Prest | |
| 8,346,753 B2 | 1/2013 | Hayes | |
| 8,359,356 B2 | 1/2013 | Belz et al. | |
| 8,395,605 B2 | 3/2013 | Sisto et al. | |
| 8,508,573 B2 | 8/2013 | Grimshaw | |
| 8,611,076 B2 | 12/2013 | Wetzel et al. | |
| 8,797,159 B2 | 8/2014 | Kirkpatrick et al. | |
| 8,799,537 B1 | 8/2014 | Zhu et al. | |
| 8,879,250 B2 | 11/2014 | Franz | |
| 8,884,896 B2 | 11/2014 | Tabone et al. | |
| 8,896,656 B2 | 11/2014 | Epstein et al. | |
| 8,909,842 B2 | 12/2014 | Johnson | |
| 8,990,469 B2 | 3/2015 | Benhard et al. | |
| 9,152,177 B2 | 10/2015 | Feldstein | |
| 9,189,751 B2 | 11/2015 | Matsuoka et al. | |
| 9,224,290 B1 | 12/2015 | Mason et al. | |
| 9,249,927 B2 | 2/2016 | Graham | |
| 9,274,994 B2 | 3/2016 | Capezza | |
| 9,304,545 B2 | 4/2016 | Ramirez et al. | |
| 9,338,268 B2 | 5/2016 | Holtman | |
| 9,377,814 B2 | 6/2016 | Ramirez et al. | |
| 9,392,427 B2 | 7/2016 | Goldman | |
| 9,411,551 B2 | 8/2016 | Haren | |
| 9,456,686 B2 | 10/2016 | Epstein | |
| 9,531,651 B1 | 12/2016 | Cherubini | |
| 9,612,628 B2 | 4/2017 | Halim et al. | |
| 9,647,481 B2 | 5/2017 | Huang et al. | |
| 9,696,777 B2 | 7/2017 | Pamley et al. | |
| 9,723,358 B1 | 8/2017 | Chan | |
| 9,736,427 B1 | 8/2017 | Grimshaw et al. | |
| 9,760,116 B2 | 9/2017 | Wylie | |
| 9,778,779 B2 | 10/2017 | Chartier et al. | |
| 9,794,496 B2 | 10/2017 | Soffer et al. | |
| 9,829,333 B1 | 11/2017 | Calder | |
| 9,838,475 B2 | 12/2017 | Brown et al. | |
| 9,961,306 B1 | 5/2018 | Lev et al. | |
| 10,001,807 B2 | 6/2018 | Chung et al. | |
| 10,108,221 B1 | 10/2018 | Jin et al. | |
| 10,354,531 B1 | 7/2019 | Bronder et al. | |
| 10,452,096 B1 | 10/2019 | Keilers et al. | |
| 10,462,611 B1 | 10/2019 | Klinkner et al. | |
| 10,623,701 B1 | 4/2020 | Bracewell et al. | |
| 11,017,334 B2 | 5/2021 | Decamp et al. | |
| 2002/0080132 A1 | 6/2002 | Dai et al. | |
| 2002/0119800 A1 | 8/2002 | Jaggers et al. | |
| 2003/0084222 A1 | 5/2003 | Wurzburg | |
| 2003/0107566 A1 | 6/2003 | Shin et al. | |
| 2003/0154293 A1 | 8/2003 | Zmolek et al. | |
| 2003/0182150 A1 | 9/2003 | Reddy | |
| 2003/0217098 A1 | 11/2003 | Bobde et al. | |
| 2003/0217142 A1 | 11/2003 | Bobde et al. | |
| 2003/0222149 A1 | 12/2003 | Solomon et al. | |
| 2004/0064621 A1 | 4/2004 | Dougherty et al. | |
| 2004/0088465 A1 | 5/2004 | Bianchi | |
| 2004/0095713 A1 | 5/2004 | Chuang | |
| 2004/0111382 A1 | 6/2004 | Haji-Ioannou | |
| 2004/0116149 A1 | 6/2004 | Yukie et al. | |
| 2004/0125777 A1* | 7/2004 | Doyle | H04W 48/18 370/338 |
| 2004/0212586 A1 | 10/2004 | Denny | |
| 2004/0268163 A1 | 12/2004 | Yeh | |
| 2005/0033481 A1 | 2/2005 | Budhraja et al. | |
| 2005/0036283 A1 | 2/2005 | Hillman et al. | |
| 2005/0057893 A1 | 3/2005 | Homer et al. | |
| 2005/0114503 A1 | 5/2005 | Ruetschi et al. | |
| 2005/0162824 A1 | 7/2005 | Thompson | |
| 2005/0164545 A1 | 7/2005 | Rosenthal et al. | |
| 2005/0180086 A1 | 8/2005 | Schaefer et al. | |
| 2005/0245115 A1 | 11/2005 | Bell et al. | |
| 2005/0246421 A1 | 11/2005 | Moore | |
| 2006/0005055 A1 | 1/2006 | Potega | |
| 2006/0061958 A1 | 3/2006 | Solomon et al. | |
| 2006/0075286 A1 | 4/2006 | Hodge et al. | |
| 2006/0095641 A1 | 5/2006 | Pandit et al. | |
| 2006/0103504 A1 | 5/2006 | Vassallo | |
| 2006/0112375 A1 | 5/2006 | Schneider | |
| 2006/0123807 A1 | 6/2006 | Sullivan et al. | |
| 2006/0161713 A1 | 7/2006 | Belady | |
| 2006/0205381 A1 | 9/2006 | Beart et al. | |
| 2006/0250764 A1 | 11/2006 | Howarth et al. | |
| 2006/0250765 A1 | 11/2006 | Howarth et al. | |
| 2006/0250767 A1 | 11/2006 | Brophy et al. | |
| 2007/0030276 A1 | 2/2007 | Macinnis et al. | |
| 2007/0033289 A1 | 2/2007 | Nuyttens et al. | |
| 2007/0054550 A1 | 3/2007 | Cuthbert et al. | |
| 2007/0058332 A1 | 3/2007 | Canterbury et al. | |
| 2007/0065078 A1* | 3/2007 | Jiang | H04L 12/2885 385/76 |
| 2007/0070598 A1 | 3/2007 | Chuang | |
| 2007/0074284 A1 | 3/2007 | Woog | |
| 2007/0097618 A1 | 5/2007 | Searby et al. | |
| 2007/0101039 A1 | 5/2007 | Rutledge et al. | |
| 2007/0120874 A1 | 5/2007 | Macinnis et al. | |
| 2007/0130323 A1 | 6/2007 | Landsman et al. | |
| 2007/0168593 A1 | 7/2007 | Montag et al. | |
| 2008/0036780 A1 | 2/2008 | Liang et al. | |
| 2008/0053770 A1 | 3/2008 | Tynyk | |
| 2008/0119241 A1 | 5/2008 | Dorogusker et al. | |
| 2008/0126594 A1 | 5/2008 | Monks et al. | |
| 2008/0194119 A1 | 8/2008 | Mori | |
| 2008/0239681 A1 | 10/2008 | Iida | |
| 2008/0244026 A1 | 10/2008 | Holt et al. | |
| 2008/0313108 A1 | 12/2008 | Carrabis | |
| 2009/0058359 A1 | 3/2009 | Fischer et al. | |
| 2009/0066704 A1 | 3/2009 | Daniel et al. | |
| 2009/0072782 A1 | 3/2009 | Randall | |
| 2009/0079264 A1 | 3/2009 | Minami | |
| 2009/0079416 A1 | 3/2009 | Vinden et al. | |
| 2009/0125743 A1 | 5/2009 | Robertson et al. | |

(56) References Cited

U.S. PATENT DOCUMENTS

| | | |
|---|---|---|
| 2009/0158423 A1 | 6/2009 | Orlassino et al. |
| 2009/0177906 A1 | 7/2009 | Paniagua, Jr. et al. |
| 2009/0228614 A1 | 9/2009 | Hwang |
| 2009/0247006 A1 | 10/2009 | Thompson |
| 2009/0254313 A1 | 10/2009 | Armour et al. |
| 2009/0309748 A1 | 12/2009 | Elgort et al. |
| 2010/0037283 A1 | 2/2010 | Zhu |
| 2010/0066685 A1 | 3/2010 | Cain et al. |
| 2010/0070217 A1 | 3/2010 | Shimada et al. |
| 2010/0081473 A1 | 4/2010 | Chatterjee et al. |
| 2010/0088140 A1 | 4/2010 | Gil et al. |
| 2010/0128766 A1 | 5/2010 | Sugita |
| 2010/0138582 A1 | 6/2010 | Bird et al. |
| 2010/0174419 A1 | 7/2010 | Brumfield et al. |
| 2010/0182262 A1 | 7/2010 | Yoshikawa et al. |
| 2010/0188808 A1 | 7/2010 | Howarth et al. |
| 2010/0191487 A1 | 7/2010 | Rada et al. |
| 2010/0251361 A1 | 9/2010 | Collopy et al. |
| 2010/0259213 A1 | 10/2010 | Maharaj |
| 2010/0295384 A1 | 11/2010 | Kobayashi |
| 2010/0302454 A1 | 12/2010 | Epstein et al. |
| 2011/0001486 A1 | 1/2011 | Abouda et al. |
| 2011/0035443 A1 | 2/2011 | Jensen |
| 2011/0105226 A1 | 5/2011 | Perlman |
| 2011/0145466 A1 | 6/2011 | Supran et al. |
| 2011/0179291 A1 | 7/2011 | Weng et al. |
| 2011/0204843 A1 | 8/2011 | Foster |
| 2011/0208980 A1 | 8/2011 | Brooks et al. |
| 2011/0239008 A1 | 9/2011 | Lam et al. |
| 2011/0246679 A1 | 10/2011 | Sretenovic |
| 2011/0266997 A1 | 11/2011 | Krancher et al. |
| 2011/0273632 A1 | 11/2011 | Casey |
| 2011/0292640 A1 | 12/2011 | Clark et al. |
| 2011/0297566 A1 | 12/2011 | Gallagher et al. |
| 2012/0034951 A1 | 2/2012 | Jones et al. |
| 2012/0054400 A1 | 3/2012 | Iverson et al. |
| 2012/0068538 A1 | 3/2012 | Ye et al. |
| 2012/0081087 A1 | 4/2012 | Ching-Wei |
| 2012/0110360 A1 | 5/2012 | Lin et al. |
| 2012/0120581 A1 | 5/2012 | Haren |
| 2012/0155013 A1 | 6/2012 | Huang |
| 2012/0203949 A1 | 8/2012 | Benhard et al. |
| 2012/0229076 A1 | 9/2012 | Zhu et al. |
| 2012/0275526 A1 | 11/2012 | Hughes |
| 2012/0278640 A1 | 11/2012 | Caglianone |
| 2012/0314777 A1 | 12/2012 | Zhang et al. |
| 2013/0010418 A1 | 1/2013 | Flynn et al. |
| 2013/0050216 A1 | 2/2013 | Whitby-Strevens et al. |
| 2013/0054348 A1* | 2/2013 | Holsman ............... G06Q 30/00 705/14.43 |
| 2013/0057567 A1 | 3/2013 | Frank et al. |
| 2013/0060662 A1 | 3/2013 | Carlson et al. |
| 2013/0106979 A1 | 5/2013 | Chang et al. |
| 2013/0143521 A1 | 6/2013 | Hernandez et al. |
| 2013/0159756 A1 | 6/2013 | Ellis |
| 2013/0165046 A1 | 6/2013 | Tang et al. |
| 2013/0205060 A1 | 8/2013 | Benhard et al. |
| 2013/0311801 A1 | 11/2013 | Kong et al. |
| 2014/0028462 A1 | 1/2014 | Lawson |
| 2014/0117780 A1 | 5/2014 | Buchheim et al. |
| 2014/0136749 A1 | 5/2014 | North et al. |
| 2014/0150812 A1 | 6/2014 | Liao |
| 2014/0168884 A1 | 6/2014 | Wylie et al. |
| 2014/0172478 A1 | 6/2014 | Vadasz |
| 2014/0172731 A1 | 6/2014 | Ericksen et al. |
| 2014/0181350 A1 | 6/2014 | Pedro et al. |
| 2014/0208134 A1 | 7/2014 | Waters et al. |
| 2014/0244869 A1 | 8/2014 | Adrian et al. |
| 2014/0278645 A1 | 9/2014 | Davidson et al. |
| 2014/0301575 A1 | 10/2014 | Holtman et al. |
| 2014/0316584 A1 | 10/2014 | Matsuoka et al. |
| 2014/0342669 A1 | 11/2014 | Zeung et al. |
| 2014/0359318 A1 | 12/2014 | Liu et al. |
| 2014/0365396 A1 | 12/2014 | Kumar et al. |
| 2015/0006026 A1 | 1/2015 | Schaffer et al. |
| 2015/0013010 A1 | 1/2015 | Rozenweig |
| 2015/0035939 A1 | 2/2015 | Hillier et al. |
| 2015/0036051 A1 | 2/2015 | Broberg et al. |
| 2015/0046624 A1 | 2/2015 | Ramirez et al. |
| 2015/0081381 A1 | 3/2015 | Okoba |
| 2015/0082061 A1 | 3/2015 | Ramirez et al. |
| 2015/0106814 A1 | 4/2015 | Vilke et al. |
| 2015/0169477 A1 | 6/2015 | Beel et al. |
| 2015/0170497 A1 | 6/2015 | Thuersam et al. |
| 2015/0195489 A1 | 7/2015 | Sobti et al. |
| 2015/0237191 A1 | 8/2015 | Moran et al. |
| 2015/0281627 A1 | 10/2015 | Wang et al. |
| 2015/0295440 A1 | 10/2015 | Liao |
| 2015/0346792 A1 | 12/2015 | Rathi et al. |
| 2015/0356045 A1 | 12/2015 | Soffer |
| 2015/0370681 A1 | 12/2015 | Tonry et al. |
| 2015/0378420 A1 | 12/2015 | Ippolito et al. |
| 2016/0026883 A1 | 1/2016 | Matos |
| 2016/0050375 A1 | 2/2016 | Soffer et al. |
| 2016/0065633 A1 | 3/2016 | Kawakubo |
| 2016/0173678 A1 | 6/2016 | Decamp |
| 2016/0187963 A1 | 6/2016 | Leinonen et al. |
| 2016/0193932 A1 | 7/2016 | Pedram |
| 2016/0195856 A1 | 7/2016 | Spero |
| 2016/0195897 A1 | 7/2016 | Robinson |
| 2016/0285310 A1 | 9/2016 | Tan et al. |
| 2016/0308929 A1 | 10/2016 | Fu |
| 2016/0321333 A1 | 11/2016 | Oka |
| 2017/0024197 A1 | 1/2017 | Pantelka et al. |
| 2017/0054734 A1 | 2/2017 | Sigal et al. |
| 2017/0068913 A1 | 3/2017 | Pignataro et al. |
| 2017/0099361 A1 | 4/2017 | Digilov et al. |
| 2017/0123456 A1 | 5/2017 | Chung et al. |
| 2017/0140235 A1 | 5/2017 | Yu et al. |
| 2017/0255452 A1 | 9/2017 | Barnes et al. |
| 2017/0262779 A1 | 9/2017 | Remaker |
| 2017/0325318 A1 | 11/2017 | Wendt et al. |
| 2017/0336846 A1 | 11/2017 | Shieh et al. |
| 2017/0345290 A1 | 11/2017 | Law et al. |
| 2017/0351638 A1* | 12/2017 | Chen ............... G06F 13/4282 |
| 2017/0374114 A1 | 12/2017 | Feldman |
| 2018/0017992 A1 | 1/2018 | Wylie |
| 2018/0067885 A1* | 3/2018 | Hsieh ............... G06F 1/22 |
| 2018/0103212 A1 | 4/2018 | Epstein et al. |
| 2018/0131148 A1 | 5/2018 | Liu |
| 2018/0143664 A1 | 5/2018 | Wylie |
| 2018/0143665 A1 | 5/2018 | Wylie |
| 2018/0143934 A1 | 5/2018 | Li |
| 2018/0189730 A1 | 7/2018 | Wilkinson et al. |
| 2018/0191113 A1 | 7/2018 | Byrne et al. |
| 2018/0267681 A1 | 9/2018 | Epstein |
| 2018/0324393 A1 | 11/2018 | Ryan et al. |
| 2018/0338368 A1 | 11/2018 | Pfund et al. |
| 2019/0005476 A1 | 1/2019 | Luo et al. |
| 2019/0018811 A1 | 1/2019 | Hundal et al. |
| 2019/0025353 A1 | 1/2019 | Decamp |
| 2019/0025354 A1 | 1/2019 | Decamp |
| 2019/0025355 A1 | 1/2019 | Decamp |
| 2019/0197009 A1* | 6/2019 | Chen ............... G06F 13/385 |
| 2019/0228348 A1 | 7/2019 | O'Keefe-Sally et al. |
| 2019/0243419 A1 | 8/2019 | Charlesworth et al. |
| 2019/0272141 A1 | 9/2019 | Poel et al. |
| 2019/0354361 A1 | 11/2019 | Gang et al. |
| 2019/0361407 A1 | 11/2019 | Vogel et al. |
| 2019/0389064 A1 | 12/2019 | High et al. |
| 2019/0392356 A1 | 12/2019 | Munir et al. |
| 2020/0104762 A1 | 4/2020 | Gibson et al. |
| 2020/0201388 A1 | 6/2020 | Spyrison et al. |
| 2020/0218324 A1 | 7/2020 | Decamp et al. |
| 2020/0219036 A1 | 7/2020 | Decamp et al. |
| 2020/0241597 A1 | 7/2020 | Decamp et al. |
| 2020/0256902 A1 | 8/2020 | Decamp et al. |
| 2020/0326955 A1 | 10/2020 | Adiletta et al. |
| 2021/0051298 A1 | 2/2021 | Atkins et al. |
| 2021/0058584 A1 | 2/2021 | Decamp et al. |
| 2021/0072792 A1 | 3/2021 | Decamp et al. |
| 2021/0073155 A1 | 3/2021 | Decamp et al. |
| 2021/0181794 A1 | 6/2021 | Chung et al. |

(56) References Cited

U.S. PATENT DOCUMENTS

| | | | |
|---|---|---|---|
| 2021/0233010 | A1 | 7/2021 | Decamp et al. |
| 2021/0258538 | A1 | 8/2021 | Decamp, II et al. |
| 2022/0011382 | A1* | 1/2022 | Chiang .................. G01R 31/69 |

FOREIGN PATENT DOCUMENTS

| | | | |
|---|---|---|---|
| CN | 104094187 | | 10/2014 |
| CN | 104838558 | | 8/2015 |
| CN | 105593782 | | 5/2016 |
| CN | 106707834 | | 5/2017 |
| CN | 107274660 | A | 10/2017 |
| CN | 107702282 | A | 2/2018 |
| DE | 102013104216 | | 11/2013 |
| EP | 1085400 | A2 | 3/2001 |
| EP | 2722728 | | 4/2014 |
| EP | 2823372 | | 1/2015 |
| EP | 2929613 | | 10/2015 |
| EP | 3030948 | | 6/2016 |
| EP | 3087476 | | 11/2016 |
| GB | 2457252 | A | 8/2009 |
| GB | 2513197 | A | 10/2014 |
| IN | 201617004084 | | 12/2015 |
| IN | 201406041 | | 1/2016 |
| JP | 2013239178 | | 11/2013 |
| JP | 6110878 | | 5/2015 |
| JP | 2016504900 | | 2/2016 |
| KR | 1020090069890 | A | 7/2009 |
| KR | 1020140069684 | | 6/2014 |
| KR | 101452319 | | 10/2014 |
| KR | 20150091362 | | 8/2015 |
| KR | 1020150130842 | | 11/2015 |
| KR | 2020100000082 | | 1/2020 |
| RU | 2630376 | | 7/2017 |
| TW | I387182 | B1 | 2/2013 |
| TW | 201347581 | | 11/2013 |
| WO | 03030304 | A2 | 4/2003 |
| WO | 2005003983 | A1 | 1/2005 |
| WO | 2008109193 | A1 | 9/2008 |
| WO | 2011138581 | A2 | 11/2011 |
| WO | 2013024855 | A1 | 2/2013 |
| WO | 2013033573 | A2 | 3/2013 |
| WO | 2016011566 | A1 | 1/2016 |
| WO | 2017140474 | | 8/2017 |
| WO | 20018216004 | A1 | 11/2018 |
| WO | 2019018007 | | 1/2019 |
| WO | 2020142525 | A1 | 7/2020 |
| WO | 2021035156 | A1 | 2/2021 |
| WO | 2021050215 | A1 | 3/2021 |
| WO | 2021050575 | A1 | 3/2021 |

OTHER PUBLICATIONS

U.S. Appl. No. 16/999,778 , Notice of Allowance, dated Mar. 19, 2021, 13 pages.
U.S. Appl. No. 16/999,778 , Non-Final Office Action, dated Nov. 13, 2020, 16 pages.
PCT/US2015/065730, et al., International Search Report and Written Opinion , dated Apr. 6, 2016 ,16 pgs.
PCT/US2017/048367, et al., International Preliminary Report on Patentability , dated Mar. 21, 2019 ,9 pages.
PCT/US2017/048367, et al., International Search Report and Written Opinion , dated Oct. 27, 2017 ,15 pgs.
PCT/US2018/017232, et al., International Preliminary Report on Patentability , dated Jan. 30, 2020 ,9 pages.
PCT/US2018/017232, et al., International Search Report and Written Opinion , dated May 21, 2018 ,13 pgs.
PCT/US2019/067581, et al., International Search Report and Written Opinion , dated Apr. 23, 2020 ,10 pages.
PCT/US2019/069120, et al., International Search Report and Written Opinion , dated Apr. 29, 2020 ,11 pages.
PCT/US2020/046703, et al., International Search Report and Written Opinion , dated Jan. 13, 2021 ,12 pages.
PCT/US2020/046703, et al., Invitation to Pay Additional Fees and, Where Applicable, Protest Fee , dated Oct. 29, 2020 ,2 pages.
PCT/US2020/047448, et al., International Search Report and Written Opinion , dated Nov. 20, 2020 ,13 pages.
PCT/US2020/049980, et al., International Search Report and Written Opinion , dated Nov. 27, 2020 ,15 pages.
Wikipedia, et al., USB, https://web.archive.org/web/20141024053934/https://en.wikipedia.org/wiki/USB ,Oct. 24, 2014 ,42 pages.
U.S. Appl. No. 17/308,351 , Notice of Allowance, dated Mar. 29, 2022, 5 pages.
U.S. Appl. No. 16/446,440, Notice of Allowance, dated Mar. 31, 2022, 8 pages.
U.S. Appl. No. 16/833,089, Non-Final Office Action, dated Apr. 8, 2022, 23 pages.
U.S. Appl. No. 17/229,547, Non-Final Office Action, dated Feb. 15, 2022, 24 pages.
U.S. Appl. No. 16/849,799 , Notice of Allowance, dated Oct. 8, 2021, 5 pages.
U.S. Appl. No. 17/308,351 , Non-Final Office Action, dated Nov. 15, 2021, 14 pages.
U.S. Appl. No. 13/365,754, et al., Final Office Action , dated Dec. 27, 2013 ,18 pgs.
U.S. Appl. No. 13/365,754, et al., Notice of Allowance , dated Feb. 4, 2015 ,8 pgs.
U.S. Appl. No. 13/365,754, et al., Final Office Action , dated Jun. 10, 2014 ,22 pgs.
U.S. Appl. No. 13/365,754, et al., Non-Final Office Action , dated May 13, 2014 ,18 pgs.
U.S. Appl. No. 13/365,754, et al., Non-Final Office Action , dated Sep. 10, 2013 ,15 pgs.
U.S. Appl. No. 13/365,754, et al., Non-Final Office Action , dated Sep. 17, 2014 ,25 pgs.
U.S. Appl. No. 13/786,038, et al., Non-Final Office Action , dated Sep. 18, 2014 ,24 pgs.
U.S. Appl. No. 14/634,196, et al., Non-Final Office Action , dated Sep. 7, 2016 ,25 pgs.
U.S. Appl. No. 14/923,833, et al., Final Office Action , dated Aug. 9, 2017 ,22 pgs.
U.S. Appl. No. 14/923,833, et al., Notice of Allowance , dated Dec. 18, 2017 ,5 pgs.
U.S. Appl. No. 14/923,833, et al., Non-Final Office Action , dated Mar. 2, 2017 ,22 pgs.
U.S. Appl. No. 14/923,833, et al., Non-Final Office Action , dated Nov. 1, 2016 ,14 pgs.
U.S. Appl. No. 14/970,318, et al., Notice of Allowance , dated Dec. 6, 2017 ,11 pgs.
U.S. Appl. No. 14/970,318, et al., Non-Final Office Action , dated Feb. 6, 2017 ,21 pgs.
U.S. Appl. No. 14/970,318, et al., Final Office Action , dated Jul. 11, 2017 ,25 pgs.
U.S. Appl. No. 14/970,318, et al., Non-Final Office Action , dated Oct. 14, 2016 ,13 pgs.
U.S. Appl. No. 14/970,318, et al., Advisory Action , dated Sep. 28, 2017 ,3 pgs.
U.S. Appl. No. 15/261,204, et al., Non-Final Office Action , dated Apr. 30, 2018 ,20 pgs.
U.S. Appl. No. 15/261,204, et al., Advisory Action , dated Feb. 1, 2019 ,7 pages.
U.S. Appl. No. 15/261,204, et al., Notice of Allowance , dated Feb. 4, 2020 ,8 pages.
U.S. Appl. No. 15/261,204, et al., Non-Final Office Action , dated Jun. 27, 2019 ,20 pages.
U.S. Appl. No. 15/261,204, et al., Final Office Action , dated Nov. 2, 2018 ,22 pgs.
U.S. Appl. No. 15/655,669, et al., Final Office Action , dated May 16, 2019 ,16 pages.
U.S. Appl. No. 15/655,699, et al., Advisory Action , dated Aug. 1, 2019 ,4 pages.
U.S. Appl. No. 15/655,699, et al., Final Office Action , dated Feb. 7, 2020 ,8 pages.
U.S. Appl. No. 15/655,699, et al., Notice of Allowance , dated Mar. 6, 2020 ,7 pages.

(56) References Cited

OTHER PUBLICATIONS

U.S. Appl. No. 15/655,699, et al., Non-Final Office Action, dated Nov. 19, 2018 ,37 pgs.
U.S. Appl. No. 15/655,699, et al., Non-Final Office Action, dated Sep. 6, 2019 ,18 pages.
U.S. Appl. No. 15/905,241, et al., Non-Final Office Action, dated Nov. 2, 2018 ,34 pgs.
U.S. Appl. No. 16/029,339, et al., Final Office Action, dated Apr. 19, 2019 ,14 pages.
U.S. Appl. No. 16/029,339, et al., Non-Final Office Action, dated Aug. 8, 2019 ,14 pages.
U.S. Appl. No. 16/029,339, et al., Notice of Allowance, dated Dec. 4, 2019 ,10 pages.
U.S. Appl. No. 16/029,339, et al., Non-Final Office Action, dated Nov. 2, 2018 ,28 pgs.
U.S. Appl. No. 16/240,124, et al., Notice of Allowance, dated Feb. 22, 2021 ,9 pages.
U.S. Appl. No. 16/240,124, et al., Non-Final Office Action, dated Nov. 13, 2020 ,30 pages.
U.S. Appl. No. 16/849,858, et al., Notice of Allowance, dated Jan. 22, 2021 ,8 pages.
U.S. Appl. No. 16/849,858, et al., Non-Final Office Action, dated Jun. 26, 2020 ,12 pages.
17849313.6, et al., Extended European Search Report, dated Mar. 25, 2020 ,8 pages.
Agnihotri,Mohit et al.,"Topology Formation in Mesh Networks Considering Role Suitability", Workshop on Device Communications for 5G Networks, WD5G ,2016 ,7 pages.
Dell, et al., Dell Docking Station WD15 User Guide, ,2015 ,31 pages.
Dong,Wei et al.,"Web-based Building Energy Consumption Monitoring and Conservation Service", 4th International Conference on Mechatronics, Materials, Chemistry and Computer Engineering (ICMMCCE 2015) ,pp. 3036-3040.
Fink,Thomas et al.,"Toshiba Dynadock V Review", Laptop Magazine, retrieved from the Internet on Dec. 21, 2013, at <http://www.laptopmag.com/review/accessories/Toshiba-dynadock-v.aspx> ,Aug. 9, 2010 ,pp. 1-2.
Ganesh, et al.,"Visible Engergy UFO Power Center Smart Power Strip Review", AnandTech, http://www.anandtech.com/show/6413/visible-energy-ufo-power-center-smart-power-stripreview ,Oct. 26, 2012.
PCT/US2012/023717, et al., International Preliminary Report on Patentability, dated Aug. 15, 2013 ,6 pgs.
PCT/US2012/023717, et al., International Search Report and Written Opinion, dated Aug. 30, 2012 ,9 pgs.
PCT/US2014/017434, et al., International Search Report and Written Opinion, dated Jun. 30, 2014 ,8 pgs.
PCT/US2014/017434, et al., International Preliminary Report on Patentability, dated Sep. 17, 2015 ,10 pgs.
PCT/US2015/065730, et al., International Preliminary Report on Patentability, dated Apr. 6, 2016 ,13 pgs.
U.S. Appl. No. 16/721,403, Non-Final Office Action, dated Feb. 1, 2022, 17 pages.

\* cited by examiner

SYSTEMS, METHODS AND DEVICES FOR NATIVE AND VIRTUALIZED VIDEO IN A HYBRID DOCKING STATION

RELATED APPLICATIONS

The present application is a continuation of and claims priority to U.S. patent application Ser. No. 16/849,858, filed Apr. 15, 2020, which is a continuation of and claims priority to U.S. patent application Ser. No. 15/261,204, filed Sep. 9, 2016, both of which is incorporated herein by reference in its entirety.

TECHNICAL FIELD

The present disclosure relates to computer docking stations and more specifically to hybrid docking stations with switchable native and virtualized video.

BACKGROUND

The proliferation of portable electronic devices including notebook computers (e.g., laptops, netbooks, ultrabooks, etc.), tablet computers (e.g., the Apple® iPad™, Amazon® Kindle™, etc.), portable digital assistants (PDAs), and smartphones, has placed more computing power into the hands of users than the computing power of early computers that occupied an entire room. Due to their portability, however, portable electronic devices may not be ideally suited for sustained use over long periods of time. In some instances, portable electronic device interfaces may be designed primarily for portability rather than for functionality and ergonomic efficiency. For example, keyboard inputs and displays integrated in a portable electronic device (e.g., a laptop computer) may be sized significantly smaller than keyboard inputs and displays associated with a less portable system (e.g., a desktop computer). Further, a portable electronic device designer may sacrifice integrating accessory devices in a portable electronic device such as, for example, multimedia drives, printers, joysticks, pointing inputs, and the like, for increased portability of the portable electronic device.

DETAILED DESCRIPTION

Figure 1:
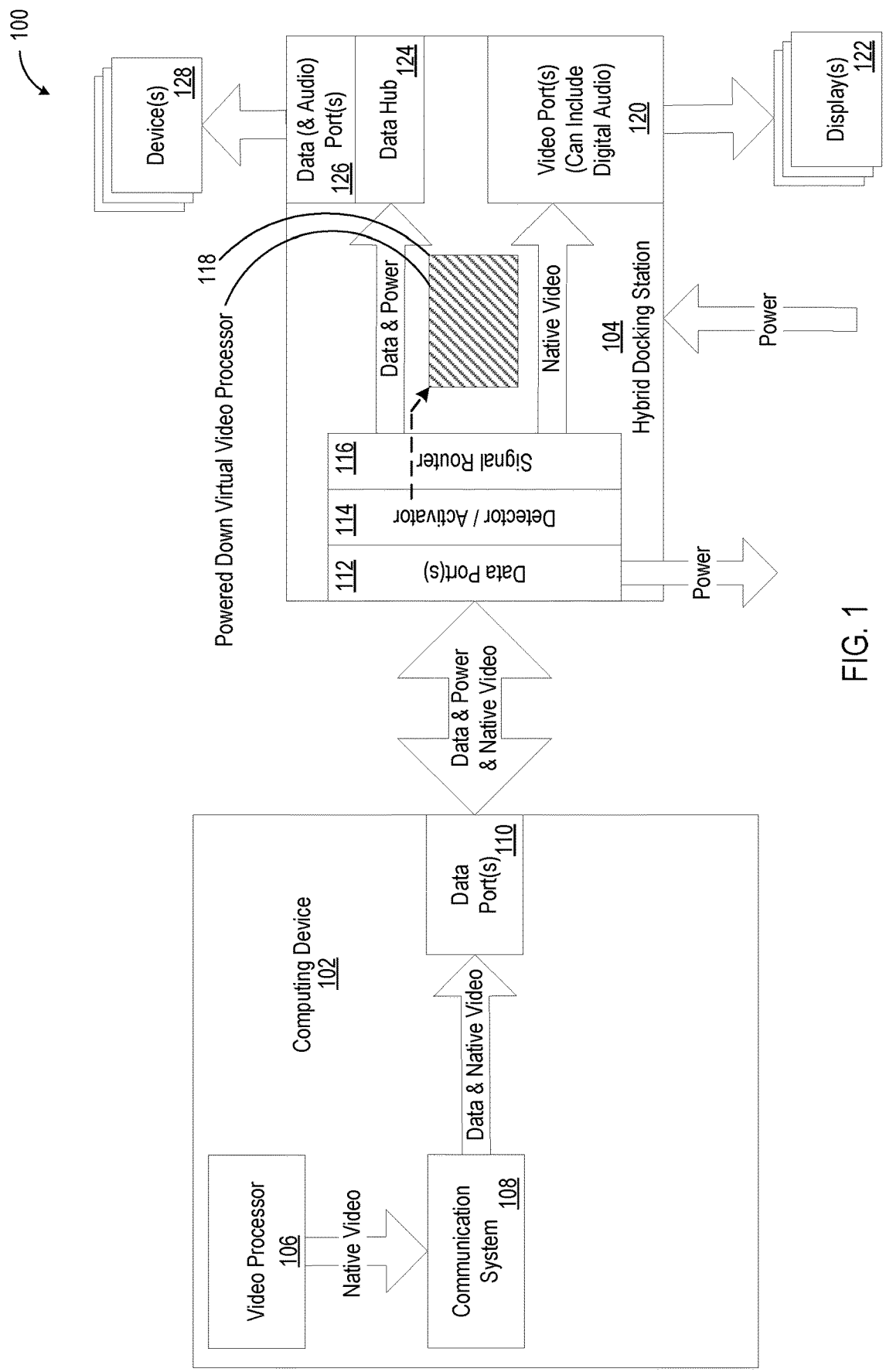
FIG. 1 is a block diagram illustrating a hybrid docking system in a native video state consistent with embodiments disclosed herein.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable a hybrid docking station to determine whether native video data exists and can be passed through to a video port or whether a virtual video processor should be activated to provide virtual video data to a video port. For example, a laptop is connected to a hybrid docking station using a USB 3.0 data interface. The hybrid docking station recognizes that the USB 3.0 data interface includes a native video data and passes the native video data to a DisplayPort™. By avoiding activating a virtualized video processor and using native video data, the laptop avoids installing software to communicate with the virtualized video processor and communicates with one or more displays using a native video channel. By avoiding installing software, management costs of updating virtualized video software can be avoided.

In another example, a tablet is connected to a hybrid docking station using a USB 3.0 interface. The hybrid docking station recognizes that the USB 3.0 interface does not include a native video data. The hybrid docking station activates a virtualized video processor, which communicates with the tablet using the USB data channel over a USB interface. Using the USB data channel, the tablet transfers virtualized video data (e.g., DisplayLink™ data, etc.) to the virtualized video processor. The virtualized video processor then provides virtualized video data to the video port for display.

A hybrid docking station can be stand-alone or formed by a retrofit of a hybrid docking adapter to a legacy docking station. For example, a hybrid docking adapter can be connected to a mobile phone through a wireless interface that includes data and native video data. The hybrid docking adapter can connect to both a data port and a video port on the legacy docking station (e.g., using a legacy docking station interface) and provide both the data and the native video data to the legacy docking station. Depending on the embodiment, some retrofit docking adapters connect directly to one or more displays, while other retrofit docking adapters connect to video ports on the legacy docking stations which transfer the video data to the display.

A retrofit of a hybrid docking adapter can also provide additional functionality and/or ports. For example, the hybrid docking adapter can provide one or more wireless interfaces that include wireless charging, additional wireless data channels (e.g., Bluetooth™, wireless local area network (WLAN), Wi-Fi™, WiMax™, ZigBee™, Z-Wave™, long term evolution (LTE™), etc.). The hybrid docking adapter can also provide management capability, energy efficiency capability (e.g., switchable outlets and/or ports, charging outlets and/or ports, sleep/power off enablement, remote management features, etc.), additional wired channels (e.g., HDMI, VGA, audio, digital audio, USB (3.0, 2.0, with power, without power, etc.), DC power, and audio visual connections (e.g., speakers, microphone, video camera, three dimensional data capture, etc.).

The hybrid docking station can be configured to identify data coming from a computing device (e.g., desktop, laptop, tablet, phablet, smart phone, 2 in 1 computers, hybrids, phone-terminal combinations, virtual desktop, think client, PC, Mac, Chromebook, iOS device, etc.) and route the virtualized video based on the input. For example, native video data can be routed on different pins over USB 3.0 (which form a pin configuration from a set of pin configurations), depending on a manufacturer specification that determines a native video data configuration (which can be from a set of native video configurations that correspond to manufacturers or models). The hybrid docking station can recognize a manufacturer configuration and route the native video data to correct pins on the video port based on the recognition.

The hybrid docking station can multiplex data (or signals) from one or more cables and/or channels. For example, data, power and native video data can be carried by one, two, three or more cables that are coupled to the hybrid docking station (e.g., plugged in, etc.). In some embodiments, one or more of the cables can be replaced by one or more wireless interfaces. For example, power can be received by the hybrid docking station through a cable, while data and native video data come over a wireless channel (e.g., Bluetooth™ WLAN, Wi-Fi™, WiMax™, ZigBee™, Z-Wave™, LTE™, etc.). In some embodiments, power, data and native video data are provided through a wireless interfaces or multiple wireless interfaces.

Figure 2:
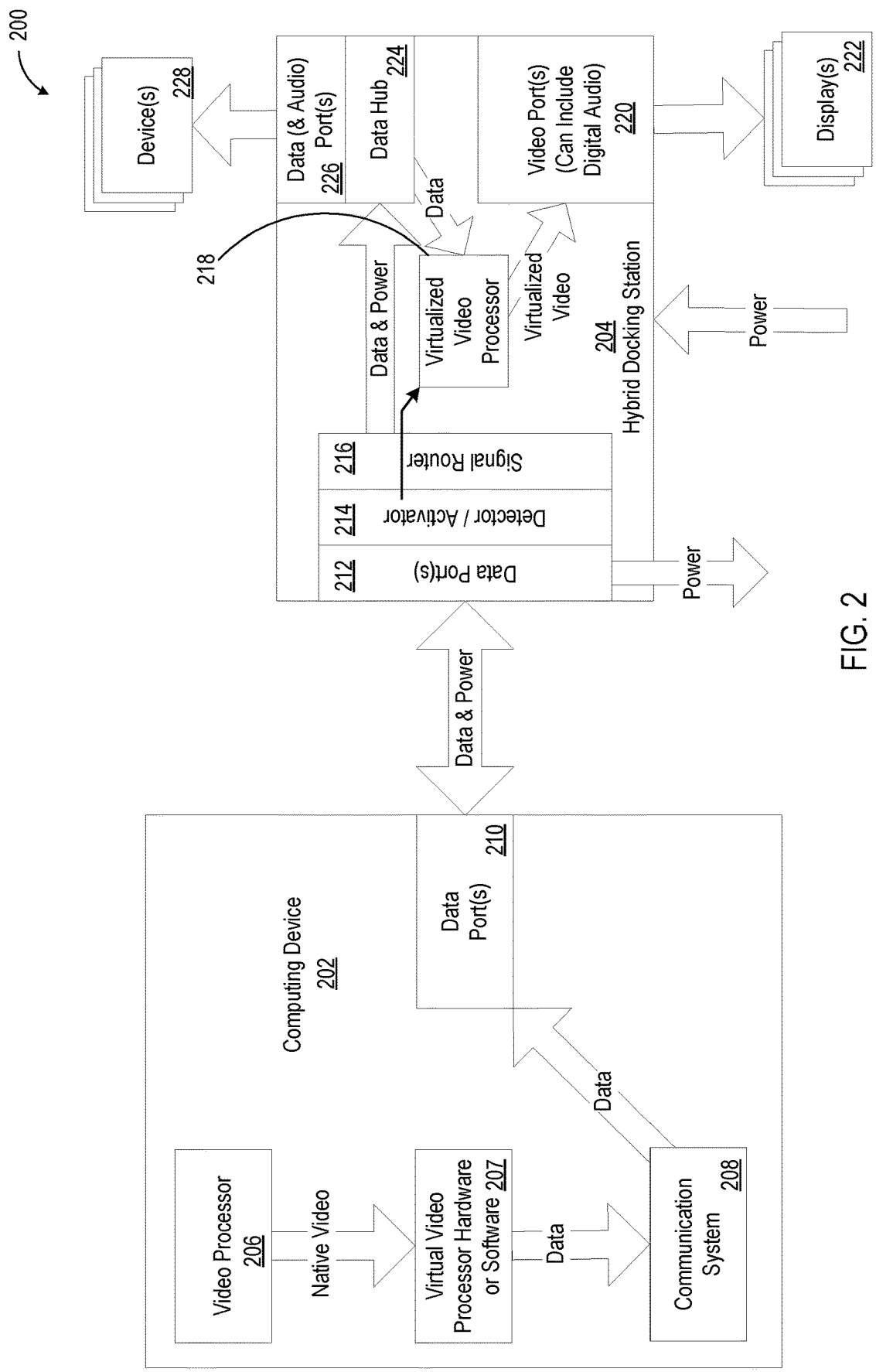
FIG. 2 is a block diagram illustrating a hybrid docking system in a virtualized video state consistent with embodiments disclosed herein.

FIGS. 1 and 2 show a hybrid docking station in different states with a focus on whether a virtual video processor is enabled. In FIG. 1, the hybrid docking station is receiving a native video data from a computing device over an interface which causes a virtual video processor to remain disabled. In FIG. 2, the native video data is absent from the interface between the computing device and the hybrid docking station, which causes activation of the virtual video processor. By providing a hybrid solution, drivers (or other support) are only needed when the virtual video processor is enabled. This allows technology managers to avoid installation and/or management of unnecessary support systems (e.g., software, drivers, etc.) on computing devices that do not require virtual video processors. Yet, technology managers can also use the hybrid docking station when virtual video processing is desired and manage support systems for the virtual video processor.

FIG. 1 is a block diagram illustrating a hybrid docking system 100 in a native video state. A computing device 102 (or computing system) is coupled to a hybrid docking station 104, with data, power and or native video channels over interfaces (e.g., computing system data interface, computing system power interface, computing system video interface, etc.). These channels can be over a single cable, multiple cables, wireless connections and/or combinations thereof. The channels can also be single directional or bidirectional. The hybrid docking station 104 is coupled to devices 128 (including peripherals, networks, etc.) and displays 122. The hybrid docking station 104 can pass-through native video data to displays 122 and connect the data channel to the devices 128 through a data interface.

The computing device 102 can include a video processor 106, communication system 108 and data port 110. The video processor 106 (e.g., graphical processing unit, system on a chip, etc.) can provide native video data to the communication system 108. The communication system 108 can provide the data, native video data to one or more data ports 110. Depending on the embodiment, data, native video data and/or power can be provided on one or more cables. In addition, data and/or native video data can be over a bidirectional channel. In some embodiments, power is received by the computing device 102 from the hybrid docking station 104. In other embodiments, power is provided to the hybrid docking station 104 by the computing device 102.

The hybrid docking station 104 can include a data port 112, detector and/or activator 114, signal router 116, virtual video processor 118, data hub 124, data ports 126, audio ports 126 and video ports 120 (which can include digital audio). In one embodiment, data, power and/or native video data is present at the data port 112. Power is provided to the computing device 102 from the data port 112. A detector/activator 114 system identifies native video data present at the data port 112 (e.g., DisplayPort™ alternate mode over USB™). The detector/activator 114 identifies the pinout of port for the native video data and causes the signal router 116 to pass through the native video data to one or more video ports 120 (e.g., DisplayPort, HDMI, composite video, component video, S-Video, DVI, etc.) coupled to one or more displays 122. Data from the data port 112 is routed by the signal router 116 or passed through to data hub 124. Data hub 124 provides data (including audio) and/or power to data & audio ports 126. Data ports & audio 126 can provide access to a data channel coupled to the computing device 102 to devices 128.

As native video data was detected by the detector/activator 114, the virtual video processor 118 can remain invisible to the computing device 102 (i.e., remain unactivated as shown by the dotted line between the activator 114 and powered down virtual video processor 118). In some embodiments, the signal router 116 breaks the electrical connection between the virtual video processor 118 and the data hub 124 when native video data is detected by the detector/activator 114. In other embodiments, the detector/activator 114 or signal router 116 removes power from the virtual video processor 118.

Depending on the embodiment, data, power and video can be provided by one cable, multiple cables, wireless connection or any combination thereof. For example, wireless charging can provide power, while a native video data is provided in conjunction with a Bluetooth™ or 802.11 AC wireless connection. In another embodiment, data, power and the native video data is provided over a USB™ 3.0 connection using a DisplayPort™ alternate mode. The DisplayPort™ data is presented over selected USB pins, while other USB pins are used for data transfer. This pinout can be recognized by the detector/activator 114 and routed by signal router 116 to video ports 120. It should be noted that some manufacturers have different pinouts for native video data, which can vary. The detector/activator 114 can recognize these pinouts (and an associated indicator, if presented) and enable the signal router 116 to correctly route native video data to the video ports 120. Remaining data can be routed to data hub 124. Data hub 124 can provide USB data connectivity to internal devices (see, e.g., FIG. 6) and data ports 126. Data ports 126 can couple devices 128 to data hub 124.

FIG. 2 is a block diagram illustrating a hybrid docking system 200 in a virtualized video state. A computing device 202 is coupled to a hybrid docking station 204, with data and/or power channels. These channels can be over a single cable, multiple cables, wireless connections and/or combinations thereof. The channels can also be single directional or bidirectional. The hybrid docking station 204 is coupled to devices 228 (including peripherals, networks, etc.) and displays 222. The hybrid docking station 204 can provide virtualized video data to displays 222 and connect the data channel to the devices 228.

The computing device 202 can include a video processor 206, virtual video processor hardware or software 207, communication system 208 and data port 210. The video processor 206 (e.g., graphical processing unit, system on a chip, etc.) can provide native video data to the virtual video processor hardware or software 207. The virtual video processor hardware or software 207 can process the native video data to form virtualized video data to be sent through communication system 208 as data. The communication system 208 can provide the data and virtualized video data to one or more data ports 210. Depending on the embodiment, data with virtualized video data and/or power can be provided on one or more cables (such as through data ports 210). In addition, data with virtualized video data can be transmitted over a bidirectional channel. In some embodiments, power is received by the computing device 202 from the hybrid docking station 204. In other embodiments, power is provided to the hybrid docking station 204 by the computing device 202.

The hybrid docking station 204 can include a data port 212, detector and/or activator 214, signal router 216, virtual video processor 218, data hub 224, data ports 226, audio ports and video ports 220. In one embodiment, power and data including video data are present at the data port 212. Power is provided to the computing device 102 from the data port 212. A detector/activator 214 system determines that native video data is absent at the data port 212. The detector/activator 214 activates (as shown by the solid line) the virtualized video processor 218 and causes the signal router 216 to connect the virtualized video processor 218 to the data hub 224 and the over an output video interface (e.g., one or more video ports 220 (e.g., Displayport, HDMI, composite video, component video, S-Video, DVI, etc.) coupled to one or more displays 222). Data from the data port 212 is routed by the signal router 216 or passed through to data hub 224. Data hub 224 provides data and/or power to data ports 226 and virtualized video data to the virtualized video processor 218. Data ports 226 can provide access to a data channel coupled to the computing device 202 to devices 228.

As native video data was not detected by the detector/activator 214 (or was absent or missing), the virtual video processor 218 is activated and is visible to the computing device 202. In some embodiments, the signal router 216 couples an electrical connection between the virtual video processor 218 and the data hub 224 when native video data is not detected by the detector/activator 214. In other embodiments, the detector/activator 214 or signal router 216 enables power to the virtual video processor 218.

Depending on the embodiment, data, power and video can be provided by one cable, multiple cables, wireless connection or any combination thereof. For example, wireless charging can provide power, while a virtualized video data is provided in conjunction with a Bluetooth™ wireless connection. In another embodiment, data, power and the virtualized video data is provided over a USB™ 3.0 connection using video virtualization. The virtualized video data is presented over the USB channel. Data can be routed to data hub 124, which provides the virtualized video data to the virtualized video processor 218. Data hub 224 can provide USB data connectivity to internal devices (see, e.g., FIG. 6) and data and audio ports 226. Data ports (and audio ports) 226 can couple devices 228 to data hub 224.

Figure 3:
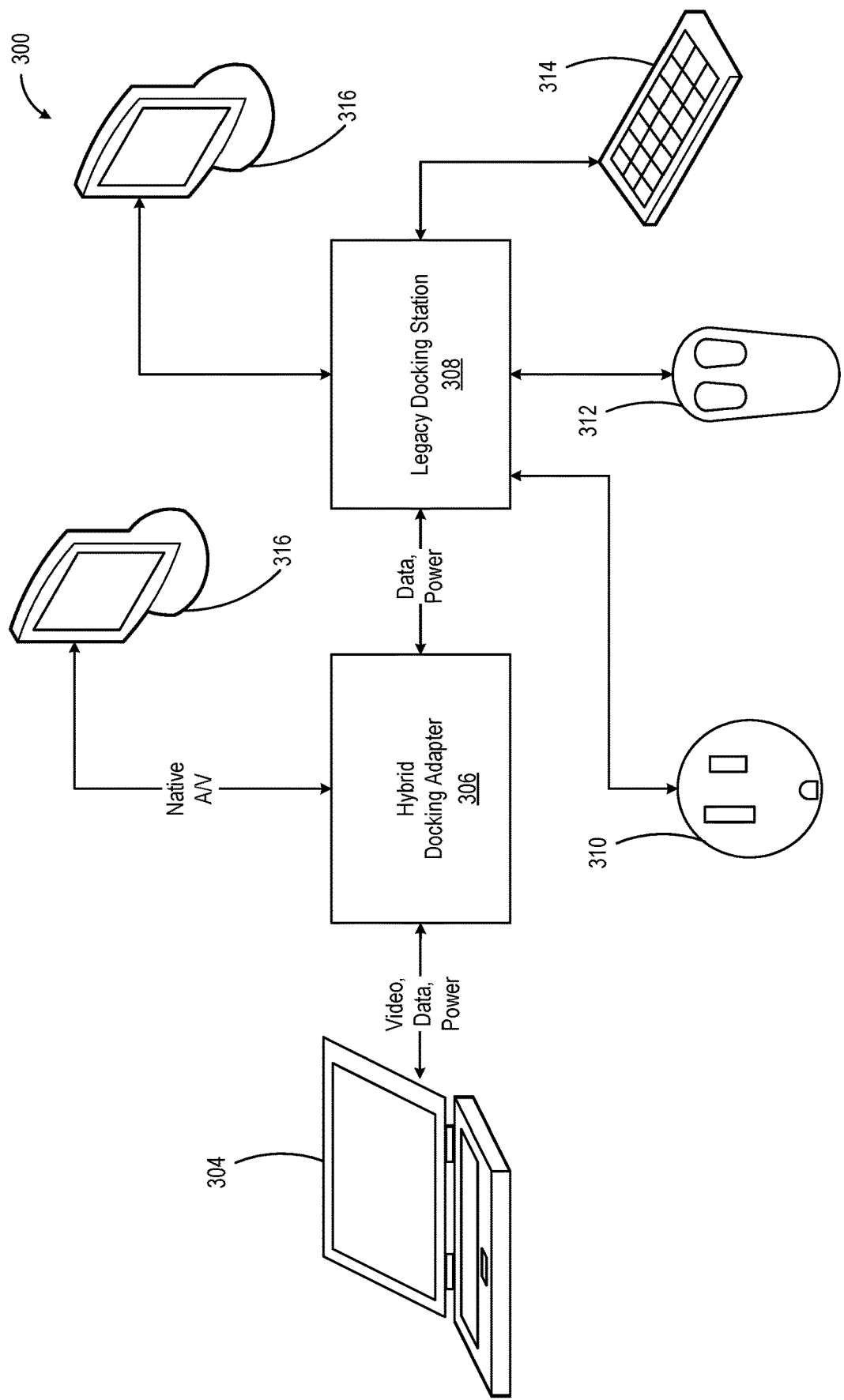
FIG. 3 is a block diagram illustrating a high level overview of a retrofit docking system consistent with embodiments disclosed herein.

FIG. 3 is a block diagram illustrating a high level overview of a retrofit docking system 300. A hybrid docking adapter 306 is coupled to a legacy docking station 308 (e.g., using a legacy docking station interface, cables, ports, etc.) to provide the advantages of automatically selecting native video or virtualized video based on whether a computing system 304 outputs native video data while providing the connectivity and/or functionality of the legacy docking station 308.

In the embodiment shown, a computing device 304 couples to the hybrid docking adapter 306 which is coupled to a legacy docking station 308. The hybrid docking adapter 306 can receive power from, legacy docking station 308 and/or computing device 304 (or sometimes a power source like power source 310). External devices, such as mouse 312, keyboard 314, network, etc. can be coupled through a data channel provided through the legacy docking station 308 and hybrid docking adapter 306 to computing device 304. The legacy docking station 308 can provide power to the hybrid docking adapter 306 and/or computing device 304 while receiving power from power source 310.

In the embodiment, when native video data (and/or audio data) is sensed from computing device 304, hybrid docking adapter 306 passes the native video data (and/or audio data) through to a display 316. Depending on the embodiment, the native video data can be directly coupled to the display 316 through a port on the hybrid docking adapter 306 or to the legacy docking station 308 which couples the native video data to the display 316. In an embodiment, the hybrid docking adapter 306 can prevent connection of a virtualized video processor in the legacy docking station 308 from connecting to the computing device 304 when native video data is detected. For example, the hybrid docking adapter 306 can block transmissions from the virtualized video processor or disable the virtualized video processor.

In an embodiment, when native video data is absent from transmissions from computing device 304, hybrid docking adapter 306 can enable (or pass through data to) a virtualized video processor to the computing device 304. The virtualized video processor can be in the hybrid docking adapter 306 or legacy docking station 308. A display 316 can receive virtualized video data from the virtualized video processor. In one embodiment, a virtualized video processor in the hybrid docking adapter 306 provides the virtualized video data to the legacy docking station 308 which transmits the virtualized video data to the display 316. In another embodiment, a virtualized video processor in the hybrid docking adapter 306 provides the virtualized video data to the display 316 without passing through the legacy docking station 308.

Figure 4:
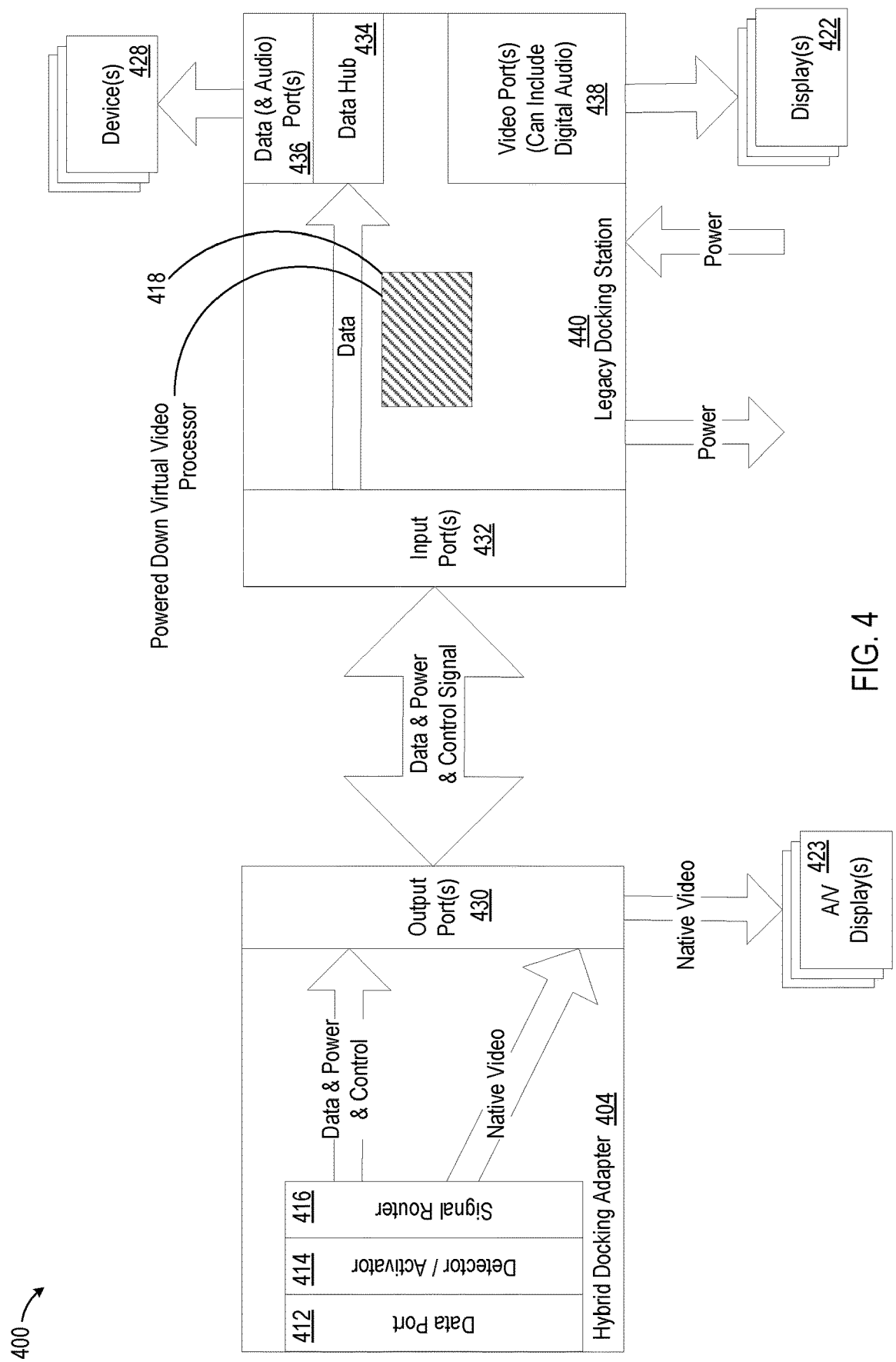
FIG. 4 is a block diagram illustrating a hybrid retrofit docking adapter in a native video state consistent with embodiments disclosed herein.
Figure 5:
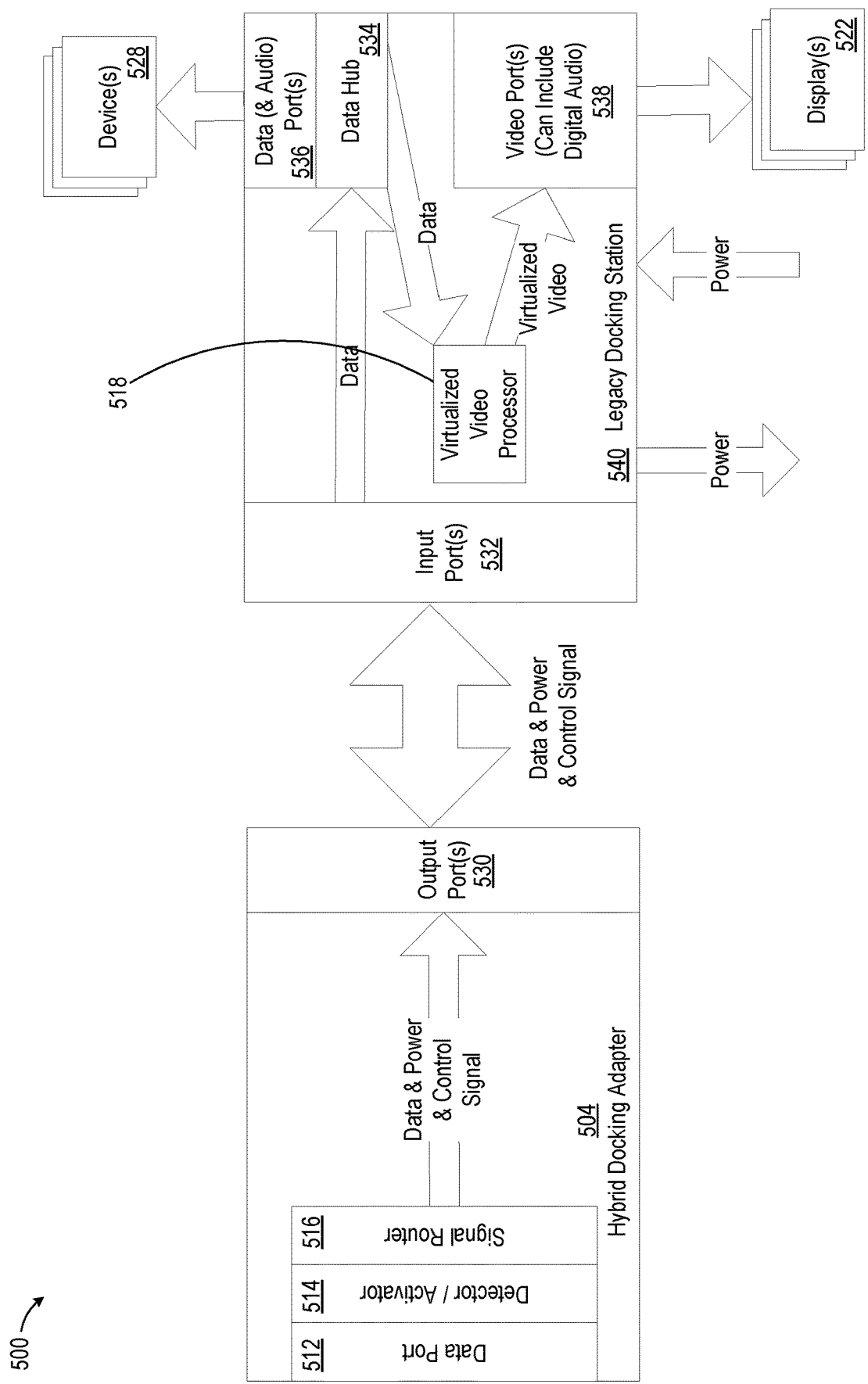
FIG. 5 is a block diagram illustrating a hybrid retrofit docking adapter in a virtualized video state consistent with embodiments disclosed herein.

FIGS. 4 and 5 show a hybrid docking adapter in different states with a focus on whether a virtual video processor is enabled. In FIG. 4, the hybrid docking adapter is receiving a native video data from a computing device which causes a virtual video processor in the legacy docking station to remain disabled. In FIG. 5, the native video data is absent from the connection between the computing device and the hybrid docking adapter, which causes activation (or enabling) of the virtual video processor in the legacy docking station. By providing a hybrid adapter solution, a legacy docking station can be reused while drivers (or other support) for video data are only needed when the virtual video processor is enabled. This allows technology managers to reuse legacy docking stations and to avoid installation and/or management of unnecessary support systems (e.g., software, drivers, etc.) on computing devices that do not require virtual video processors. Yet, technology managers can also use the hybrid docking adapter with a legacy docking station when virtual video processing is desired and manage support systems for the virtual video processor.

FIG. 4 is a block diagram illustrating a hybrid retrofit docking system 400 in a native video state. The hybrid docking adapter 404 can receive and detect native video data from a computing device. The hybrid docking adapter 404 can pass through the native video data to a display 422.

The hybrid docking adapter 404 can include a data port 412, detector and/or activator 414, signal router 416, data hub (not shown), internal devices (see, e.g., FIG. 6), and output port(s) 430. In some embodiments, the output port(s) 430 are a legacy docking station interface that couples the hybrid docking adapter 404 to the legacy docking station 440. In one embodiment, data, power and/or native video data is present at the data port 412. A detector/activator 414 system identifies native video data present at the data port 412 (e.g., DisplayPort™ alternate mode over USB™). The detector/activator 414 identifies the pinout of port for the native video data and causes the signal router 416 to pass through the native video data to the output ports 430 coupled to A/V Displays 423. Data from the data port 412 is routed by the signal router 416 or passed through to an internal data hub and/or output ports 430. In some embodiments, power is provided to the hybrid docking adapter 402 from the legacy docking station 440.

Legacy docking station 440 can include input ports 432, data hub 434, virtual video processor 418, data ports 436 and video ports 438. Data, power and control signals can be received over input ports 432. Data hub 424 provides data from input ports 432 and/or power to data ports 436. Data ports 436 can provide access for devices 428 to a data channel coupled to legacy docking station 440 which is coupled to the hybrid docking adapter 404 which is coupled to a computing device.

In one embodiment (not shown), native video data from the hybrid docking adapter 404 can be received through the input ports 432 and provided to the video ports 438 which are coupled to one or more displays 422.

As native video data was detected by the detector/activator 414, the virtual video processor can remain invisible to a computing device. In some embodiments, when native video data is present, the hybrid docking adapter 404 can disable or block virtual video processor 418 from communicating with a computing system coupled to the hybrid docking adapter 404. In other embodiments, the signal router 416 causes the electrical connection to break between the virtual video processor 418 and a data channel when native video data is detected by the detector/activator 414. In other embodiments, the detector/activator 414 or signal router 416 causes power to be removed from the virtual video processor 418.

FIG. 5 is a block diagram illustrating a hybrid retrofit docking system 500 in a virtualized video state. The hybrid docking adapter 504 can receive and detect an absence of native video data from a computing device. The hybrid docking adapter 504 can activate or allow connection to a virtual video processor to provide virtualized video data within a legacy docking station 540. The legacy docking station 540 can provide the virtualized video to a display 522. It should be noted that, depending on the embodiment, the virtualized video data can be provided over a single data connection or over multiple connections.

The hybrid docking adapter 504 can include a data port 512, detector and/or activator 514, signal router 516, data hub (not shown), internal devices (see, e.g., FIG. 6), and output port(s) 530. In one embodiment, data and/or power is present at the data port 512, but native video is absent. A detector/activator 514 system identifies native video data absence at the data port 512. The detector/activator 514 can allow access to (or activate) the virtualized video processor 518 and cause the signal router 516 to connect the virtualized video processor 518 to a computing device coupled to the hybrid docking adapter 404. Data (including data packets of virtualized video data), power and control signals from the data port 512 is routed by the signal router 516 or passed through to an internal data hub and/or output ports 530. In some embodiments, power is provided to the hybrid docking adapter 502 from the legacy docking station 540.

Legacy docking station 540 can include input ports 532, data hub 534, virtual video processor 518, data ports 536 and video ports 538. Data hub 524 provides data from input ports 532 and/or power to data ports 536. Data ports 536 can provide access for devices 528 to a data channel coupled to legacy docking station 540 which is coupled to the hybrid docking adapter 504 which is coupled to a computing device. The virtualized video processor 518 receives data from data hub 534 and provides virtualized video data to the video ports 538 which are coupled to one or more displays 522.

As native video data was not detected by the detector/activator 514 (or was absent or missing), the virtual video processor is activated (or enabled) and is visible to the computing device. Depending on the embodiment, the hybrid docking adapter can allow communication between the virtual video processor 518 and the computing device (e.g. allow data packets, allow signals, etc.). In some embodiments, the signal router 516 causes coupling of an electrical connection between the virtual video processor 518 and an internal data hub 534 when native video data is not detected by the detector/activator 514. In other embodiments, the detector/activator 514 or signal router 516 enables power to the virtual video processor 518 which passes data and virtualized video to the video ports 538.

Figure 6:
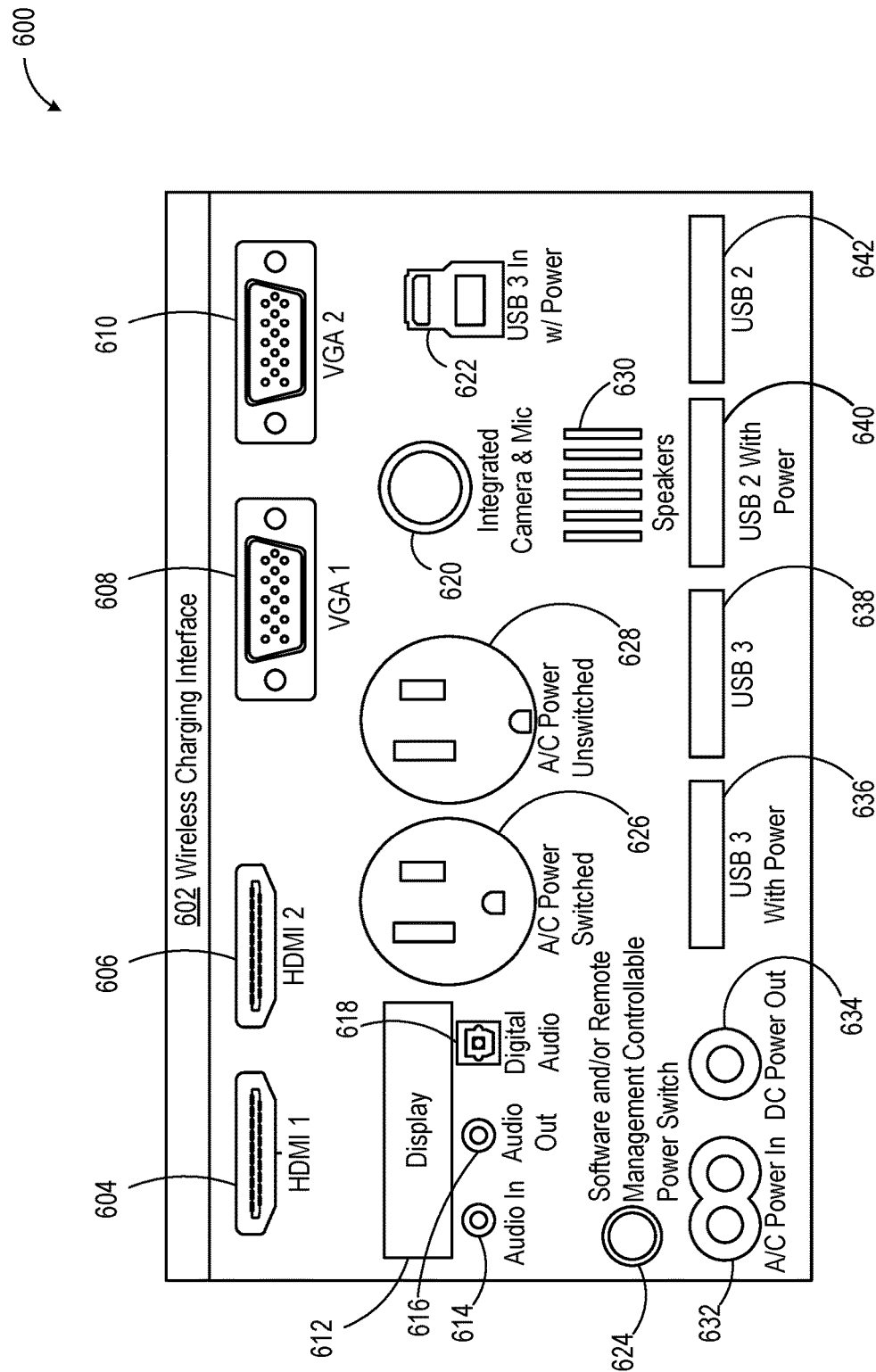
FIG. 6 is an example of a docking station input/output panel consistent with embodiments disclosed herein.

FIG. 6 is an example of a docking station input/output panel. A hybrid docking station can provide additional functionality including connectivity, integrated devices and/or management functionality. In some embodiments, one or more displays can be connected to virtualized video data, native video data and/or auxiliary data through video connectors including HDMI connectors 604, 606 and/or VGA connectors 608, 610. A display 612 can provide management messages, dock status or other information about devices, docking station, docking adapters and/or computing systems. Audio visual connections can include input audio 614, output audio 616, digital audio 618, camera 620, video camera, microphone, speakers 630, three dimensional sensors, etc. Power connections can include wireless charging interface 602, A/C power input 632, DC power output 634, switch A/C power receptacle 626, unswitched A/C power receptacle 628 and/or a software controllable power switch 624 (which can be software and/or network managed). Data connections can include USB™ outputs (various versions including 3.0 with power (636), 3.0 (638), 2.0 with power (640), 2.0 (642), etc.), USB™ inputs (including 3.0 with power 622), thunderbolt, firewire, network, etc. Wireless connections can include Bluetooth™, WLAN, Wi-Fi™, WiMax™, ZigBee™, Z-Wave™, LTE™, etc.

It should be recognized that similar functionality described in connection with FIG. 6 can be included in a hybrid docking adapter.

Figure 7:
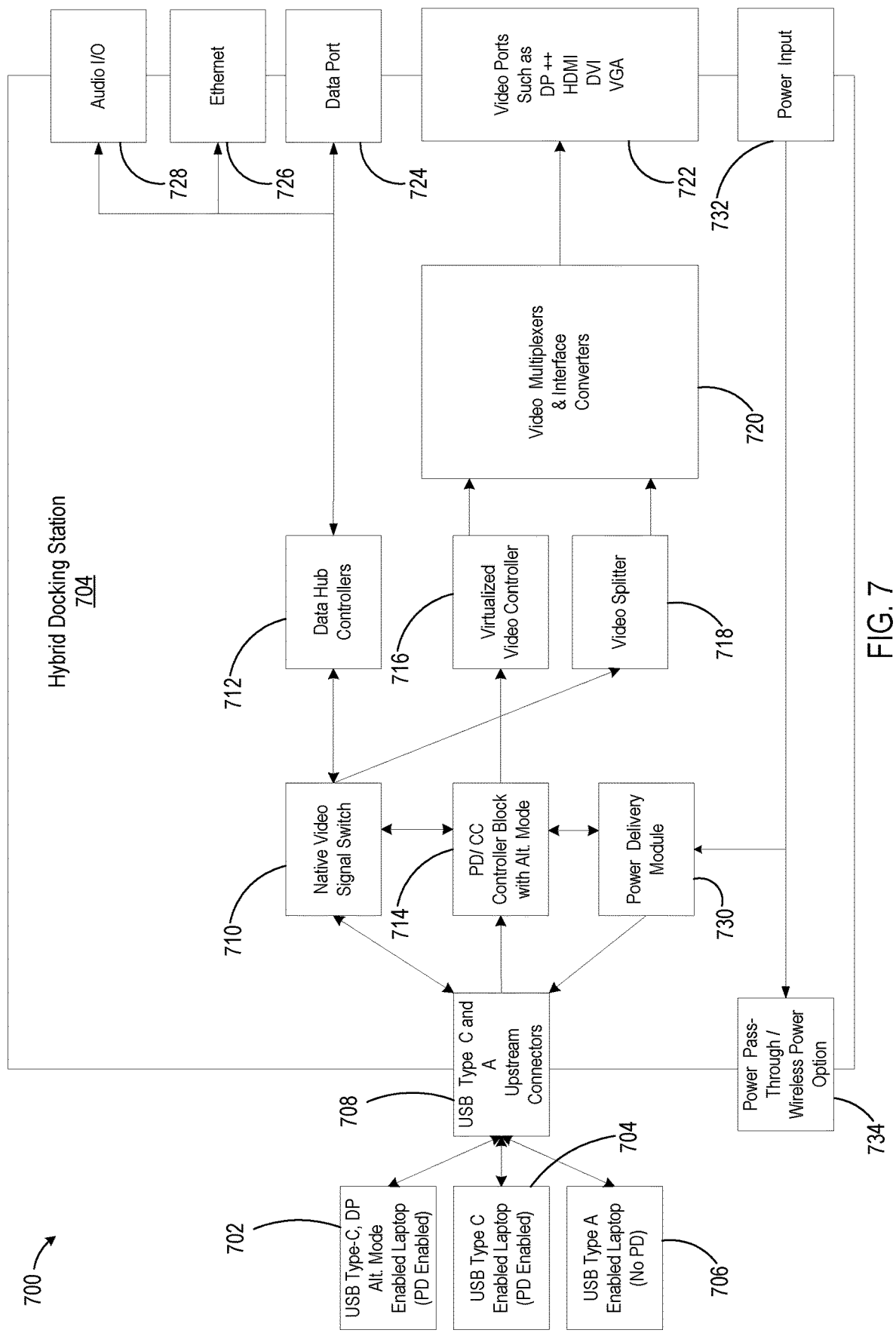
FIG. 7 is block diagram illustrating a hybrid docking station construction consistent with embodiments disclosed herein.

FIG. 7 is block diagram illustrating an embodiment of a hybrid docking station 700 construction. The docking station can connect to a USB Type-C, DisplayPort Alternate Mode enabled laptop 702, a USB Type C enabled laptop 704 or a USB Type A enabled laptop 706. Laptops 702 and 704 can include power delivery functionality enabled.

When laptop 702 is connected to the USB upstream connector 708, the DisplayPort™ native video data is detected by native video switch 710. The native video data is passed through to video splitter 718 and data is transmitted to data hub controllers 712 by native video signal switch 710. A video multiplexer/converter system 720 provides the video output on one or more ports including DisplayPort™ port, HDMI port, DVI port, VGA port, etc.

When laptop 704 or 706 is connected to the USB upstream connector 708, no native video data is detected by native video signal switch 710. PD/CC controller 714 connects the virtualized video controller 716 (e.g., a DisplayLink™ controller) to the data channel provided by USB and enables the virtualized video controller 716 for use with the laptop 704 or 706. Laptop 704 or 706 provides virtualized video data to the virtualized video controller 716 which provides virtualized video data to the video multiplexer/converter system 720. The video multiplexer/converter system 720 provides video output on one or more ports including DisplayPort™ port, HDMI port, DVI port, VGA port, etc. Data from the USB upstream connector 708 is passed through the native video switch 710 to the data hub controller 712.

Data hub controller 712 can enable a data channel between devices (including audio I/O 728, Ethernet 726 and data port 724) and laptop 702, 704 or 706. The data channel can be bidirectional.

Laptops 702 and 704 can be configured to operate with power delivery. For example, a power delivery module 730 can receive power from power input 732 and pass it through the USB upstream connector 708. The power input 732 can also provide a power pass-through/wireless power option 734 to power other devices (e.g., a display that receives power when the dock is on and does not receive power when the dock is off).

It should be recognized that FIG. 7 is an example embodiment and that other data standards, channels, native video data types, etc. can be used. For example, the data channel can be provided over a wireless connection and include native video data.

Figure 8:
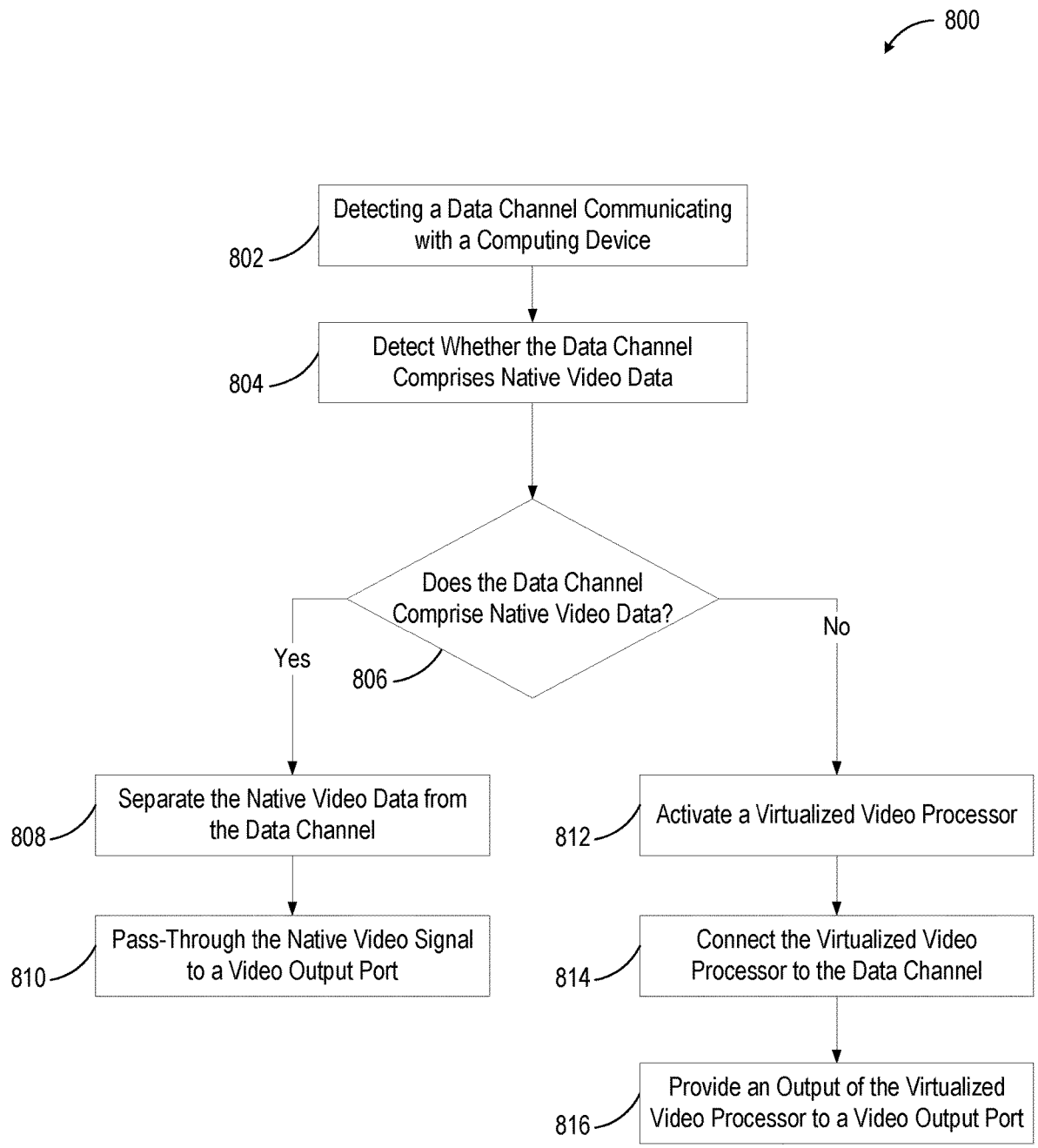
FIG. 8 is a flow chart illustrating a method for switching to native video or virtualized video consistent with embodiments disclosed herein.

FIG. 8 is a flow chart illustrating a method 800 for switching to native video or virtualized video. The method can be accomplished by systems such as those shown in FIGS. 1-6, including hybrid docking station 104, virtual video processor 118, detector/activator 114, and/or signal router 116. In block 802, a hybrid docking station detects a data channel coupled to a computing device. In block 804, the hybrid docking station detects whether the data channel comprises a native video data and makes a decision in block 806 based on whether the data channel comprises native video data.

When the data channel comprises the native video data, the hybrid docking station separates the native video data from the data channel in block 808. In block 810, the hybrid docking station passes-through the native video signal to a video output port.

When the data channel is without a native video data, the hybrid docking station activates a virtualized video processor in block 812. In block 814, the hybrid docking station connects the virtualized video processor to the data channel. In block 816, the hybrid docking station provides an output of the virtualized video processor to a video output port.

Figure 9:
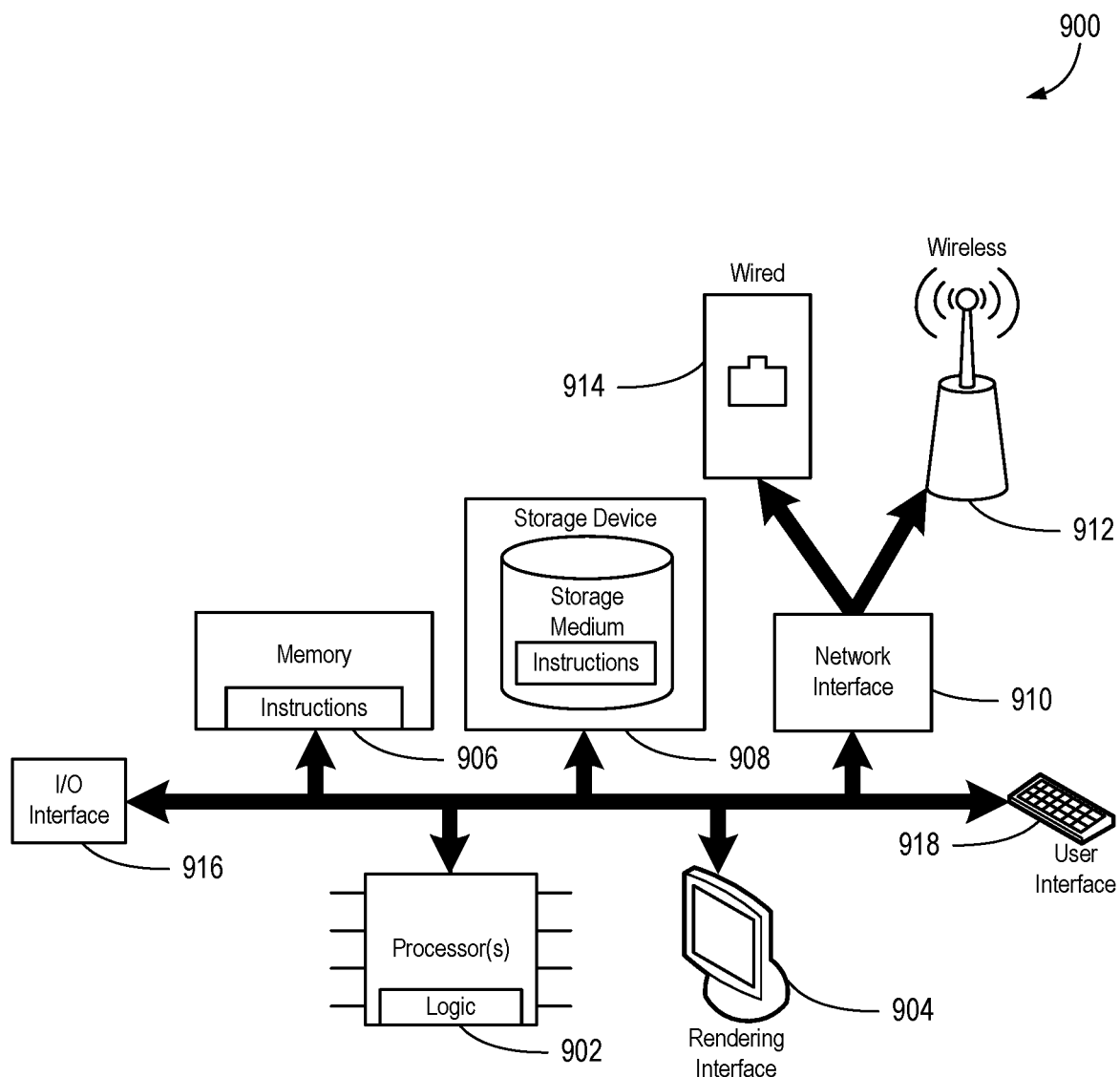
FIG. 9 is a schematic diagram of a computing system consistent with embodiments disclosed herein.

FIG. 9 is a schematic diagram of a computing system 900. Computing system 900 can be viewed as an information passing bus that connects various components. In the embodiment shown, computing system 900 includes a processor 902 having logic 902 for processing instructions. Instructions can be stored in and/or retrieved from memory 906 and storage device 908 that includes a computer-readable storage medium. Instructions and/or data can arrive from network interface 910 that can include wired 914 or wireless 912 capabilities. Instructions and/or data can also come from I/O interface 916 that can include such things as expansion cards, secondary buses (e.g., USB, etc.), devices, etc. A user can interact with computing system 900 though user interface devices 918 and rendering system 904 that allows the computer to receive and provide feedback to the user.

EXAMPLES

The following examples pertain to further embodiments.

Example 1 is a hybrid docking station. The hybrid docketing station includes a data interface designed to receive data and native video data from a computing device. The hybrid docketing station includes an output video interface designed to provide video data to a display. The hybrid docketing station includes a virtual video processor designed to activate and receive virtualized video data from the data interface and provide the virtualized video data for use with the output video interface when the native video data is absent from the data interface. The hybrid docketing station includes a detector designed to detect the native video data over the data interface and when the native video data is not detected, activate the virtual video processor, and a signal router designed to pass through the native video data to the output video interface when the native video data is present.

Example 2 is the hybrid docking station of Example 1, where the data interface includes a data port designed to accept a data cable.

Example 3 is the hybrid docking station of Example 2, where the detector is designed to identify a pin design for the native video data from a set of pin design for the data port.

Example 4 is the hybrid docking station of Example 2, where the data interface includes a USB interface.

Example 5 is the hybrid docking station of Example 4, where the native video data includes DisplayPort™ data.

Example 6 is the hybrid docking station of Example 4, where the virtualized video data includes DisplayLink™ data.

Example 7 is the hybrid docking station of Example 2, where the data interface includes a wireless interface.

Example 8 is the hybrid docking station of Example 1, where the signal router is further designed to receive the virtualized video data from the virtual video processor and provide the virtualized video data to the output video interface.

Example 9 is the hybrid docking station of Example 1, where the data interface is further electrically attached to a power source and designed to provide power to the computing device through the data interface.

Example 10 is the hybrid docking station of Example 1, where the data interface is designed to receive power, data and native video over one, two or three cables.

Example 11 is the hybrid docking station of Example 1, where the detector is designed to identify a native video data design from a set of native video designs with a variety of pin designs.

Example 12 is a method for switching a native video signal. The method includes detecting a data channel attached to a computing device. The method includes detecting whether the data channel includes native video data, when the data channel includes the native video data, separating the native video data from the data channel, passing-through the native video signal to a video output port. The method includes detecting whether the data channel includes native video data, when the data channel is without the native video data, activating a virtualized video processor, connecting the virtualized video processor to the data channel, and providing an output of the virtualized video processor to the video output port.

Example 13 is the method of Example 12, further including coupling the data channel to a legacy docking station.

Example 14 is the method of Example 12, further including providing power to the computing device.

Example 15 is the method of Example 14, where providing power to the computing device further includes wirelessly coupling the power to the computing device.

Example 16 is the method of Example 12, further including wirelessly coupling the data channel to the computing device and wirelessly receiving the native video data within the data channel.

Example 17 is the method of Example 12, where detecting whether the data channel includes the native video data further includes detecting DisplayPort™ alternate mode over USB™.

Example 18 is the method of Example 12, where when the data channel includes the native video data, disable the virtualized video processor.

Example 19 is a hybrid docking adapter. The hybrid docking adapter is a computing system data interface designed to receive data and native video data from a computing device. The hybrid docking adapter is a legacy docking station interface designed to be attached to a legacy docking station and provide data to the legacy docking station. The hybrid docking adapter is a virtual video processor designed to activate and receive virtualized video data from the computing system data interface and provide the virtualized video data for use with one or more displays when the native video data is absent from the computing system data interface. The hybrid docking adapter is a detector designed to detect the native video data over the computing system data interface and when the native video data is not detected, activate the virtual video processor. The hybrid docking adapter is a signal router designed to pass through the native video data for use with the one or more displays when the native video data is present.

Example 20. The hybrid docking adapter of Example 19, further including speakers, audio interface, video camera or microphone attached to a data channel provided by the computing system data interface.

Example 21 is the hybrid docking adapter of Example 19, further including a wireless charging interface.

Example 22 is the hybrid docking adapter of Example 19, further including a video output port designed to attach to the legacy docking station and provide the virtualized video data or the native video data to the legacy docking station for display.

Example 23 is the hybrid docking adapter of Example 19, further including a video output port designed to attached to a display and provide the virtualized video data or the native video data to the one or more displays.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

The invention claimed is:

1. A signal router for a hybrid docking station, the signal router comprising
   a switch to receive data from a data interface and detect if native video data is present in the received data, wherein:
      when the native video is present the switch passes the native video data to a video splitter to be output for display, and the received data is transmitted to a data hub; and
      when the native video is absent the switch provides an indication to a controller that no native video data is detected and passes the received data to the data hub; and
   a controller in communication with the switch, when no native video data is detected by the native video signal switch the controller to:
      connect a virtual video processor to the data interface, the received data to be converted into a video output for display; and
      enable the virtual video processor to receive the virtualized video data.

2. The signal router of claim 1, wherein to enable the virtual video processor, the controller enables power to the virtual video processor.

3. The signal router of claim 1, wherein the controller is a power delivery (PD) controller with alternate mode.

4. The signal router of claim 1, wherein the controller is a configuration channel (CC) controller with alternate mode.

5. The signal router of claim 1, further comprising a detector configured to detect the native video data over the data interface and when the native video data is not detected, activate the virtual video processor.

6. The signal router of claim 5, wherein the detector is configured to identify a pin configuration for the native video data from a set of pin configurations for the data port.

7. The signal router of claim 1, wherein the data interface comprises a universal serial bus interface.

8. A method for switching a native video signal comprising:
   receiving data from a data interface;
   detecting if native video data is present in the received data, wherein:
   when the native video is present:
      passing the native video data to a video splitter, and transmitting the received data to a data hub; and
   when the native video is absent:
      providing an indication to a controller that no native video data is detected,
      passing the received data to the data hub
      connecting, via the controller, a virtual video processor to the data interface, and
      enabling, via the controller, the virtual video processor to receive the virtualized video data to convert virtualized video data into a converted virtualized video output
   outputting to the video output port one of the native video data and the converted virtualized video output based on the presence of the native video data, wherein when the native video data is present the native video data is output for display, and when the native video data is absent the converted virtualized video output is output for display.

9. The method of claim 8, wherein enabling the virtual video processor comprises enabling power to the virtual video processor.

10. The method of claim 8, wherein the controller is a power delivery (PD) controller with alternate mode.

11. The method of claim 8, wherein the controller is a configuration channel (CC) controller with alternate mode.

12. The method of claim 8, further comprising detecting, via a detector, the native video data over the data interface and when the native video data is not detected, activate the virtual video processor.

13. The method of claim 12, wherein the detector is configured to identify a pin configuration for the native video data from a set of pin configurations for the data port.

14. The method of claim 8, wherein the data interface comprises a universal serial bus interface.

15. The method of claim 8, further comprising coupling a data channel to a legacy docking station.

16. The method of claim 8, further comprising providing power to a computing device.

17. The method of claim 16, wherein providing power to the computing device further comprises wirelessly coupling the power to the computing device.

18. The method of claim 8, further comprising wirelessly coupling a data channel to a computing device and wirelessly receiving the native video data within the data channel.

19. The method of claim 8, wherein when native video data is detected, the virtualized video processor is disabled.

* * * * *